(12) United States Patent
Matta

(10) Patent No.: US 10,644,570 B2
(45) Date of Patent: May 5, 2020

(54) FAN-COOLED ELECTRIC MACHINE

(71) Applicant: MOTEURS LEROY-SOMER, Angouleme (FR)

(72) Inventor: Pierre Matta, Angouleme (FR)

( * ) Notice: Subject to any disclaimer, the term of this patent is extended or adjusted under 35 U.S.C. 154(b) by 249 days.

(21) Appl. No.: 15/537,851

(22) PCT Filed: Dec. 18, 2015

(86) PCT No.: PCT/EP2015/080427
§ 371 (c)(1),
(2) Date: Jun. 19, 2017

(87) PCT Pub. No.: WO2016/097262
PCT Pub. Date: Jun. 23, 2016

(65) Prior Publication Data
US 2018/0013333 A1    Jan. 11, 2018

(30) Foreign Application Priority Data
Dec. 18, 2014  (FR) ................................... 14 62732

(51) Int. Cl.
*H02K 9/06* (2006.01)
*H02K 9/14* (2006.01)

(52) U.S. Cl.
CPC ............... *H02K 9/06* (2013.01); *H02K 9/14* (2013.01); *H02K 2213/09* (2013.01)

(58) Field of Classification Search
CPC ...................................................... H02K 9/06
See application file for complete search history.

(56) References Cited

U.S. PATENT DOCUMENTS

| 5,693,992 | A | 12/1997 | Kurusu et al. |
| 5,814,908 | A | 9/1998 | Muszynski |
| 6,023,112 | A | 2/2000 | Asao |
| 7,091,635 | B1 | 8/2006 | Gilliland et al. |

FOREIGN PATENT DOCUMENTS

| DE | 44 46 110 A1 | 6/1995 |
| WO | 97/41630 A1 | 11/1997 |

OTHER PUBLICATIONS

Apr. 1, 2016 International Search Report issued in International Patent Application No. PCT/EP2015/080427.

*Primary Examiner* — Ramon M Barrera
(74) *Attorney, Agent, or Firm* — Oliff PLC

(57) ABSTRACT

Electric machine including a rotor cooled by a simple disc base fan including blades, preferably of one piece with the disc, and a booster attached to the simple disc fan, the booster preferably including a disc positioned facing that of the base fan.

11 Claims, 3 Drawing Sheets

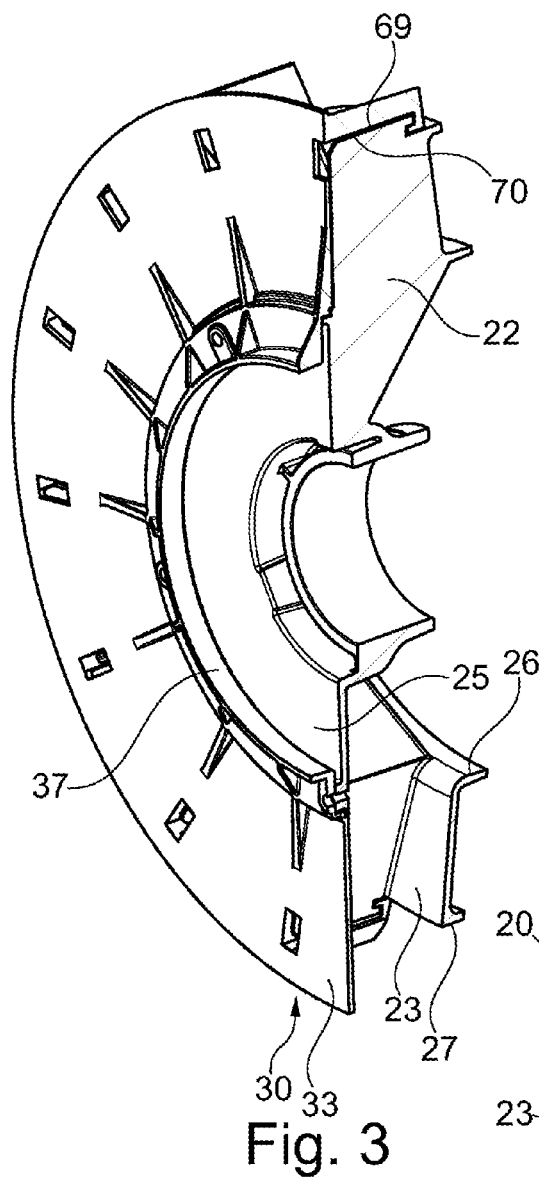
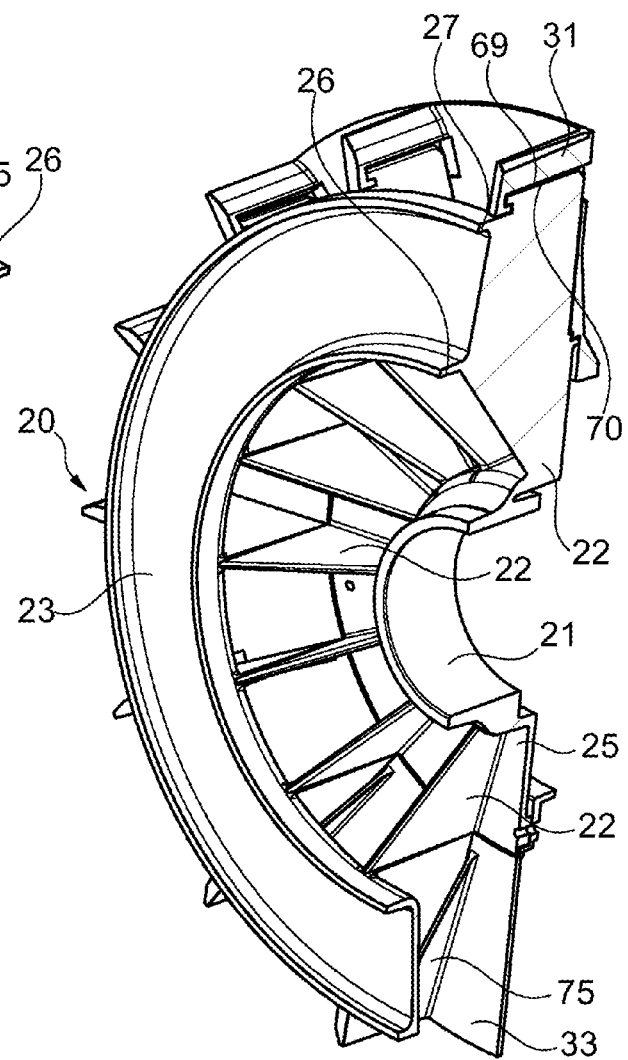
Fig. 3
Fig. 4

FAN-COOLED ELECTRIC MACHINE

The present invention relates to the cooling of electric rotating machines, and more particularly, but not exclusively, to that of alternators.

Virtually all industrial alternators are air-cooled by a ventilator mounted at the front of the machine and rotated by the rotating part via the shaft.

The air is sucked at the back of the machine and the air flow passing through the active part of the machine allows the evacuation of the calories.

There are essentially two types of ventilators on industrial alternators:

a) single-plate ventilators, characterized by a relatively simple manufacturing method of coreless molding. However, this type of ventilator has the disadvantage of having a weaker air flow compared to a dual-plate ventilator, but also of having a large input power, which brings about a reduction in the productivity of the machine. Indeed, the absence of the front plate of the ventilator disrupts the air flow and generates a zone of turbulence at the front of the machine, which reduces the thermal efficiency of the ventilator;

b) dual-plate ventilators, which provide a larger air flow with blade ISO diameter and ISO width, and also guarantee a much lower input power than that of the single-plate ventilators. However, the manufacture of this type of ventilator requires mold cores with a more or less complicated geometry.

On a range of alternators, characterized by a same type of electromagnetic metalwork, the length of iron varies according to the power of the machines in order to cover a wide range of powers and optimize the alternator according to the associated generating set.

However, on a given range of machines, the air flow required to cool each machine may vary depending on the electrical characteristics and on the power required.

This means that, for the same range of machines, several types and/or sizes of ventilators are required in order to provide optimum cooling of the active part and to guarantee compliance with the standards.

Thus, there are generally two possibilities which are, both, not optimized.

The first possibility is to standardize one ventilator per range. In this case, the ventilator is sized to meet the need of the machine of the most restrictive range in terms of heating, and which is generally the most powerful machine. However, the lower power machines then have an oversized ventilator, which generates a relatively large input power compared to the power of the machine, and this degrades the productivity of the machine.

The second possibility is the creation of several ventilators for the same range of machines. In this case, the ventilator is well sized according to the electrical power of the machine and thus the machines have a better behavior in terms of air flow, cooling and productivity. However, this choice greatly complicates the design and the process of industrial production, all the more so if a dual-plate ventilator, which is expensive to mold, is chosen.

The aim of the invention is to overcome these disadvantages, and this is accomplished thanks to an electric machine including a rotor cooled by a single-plate base ventilator, preferably including blades consisting of a single piece with the plate, and a booster attached to the single-plate ventilator, this booster preferably including a plate positioned opposite that of the base ventilator.

The booster makes up an additional piece that may be fixed on the single-plate base ventilator to increase the efficiency thereof and provide it with better performance. The booster may be centered on a dedicated zone of the base ventilator, be locked at the back of the blades and be fixed on the front face of the base ventilator.

A cooling fan, or a fan, refers to the assembly formed by the base ventilator and the booster.

An advantage of the invention is that the base ventilator may be carefully designed and optimized for the least powerful machines. This allows for avoiding oversized ventilators within a range of machines and the invention therefore not only offers an improvement in the performance and the productivity of the machines, but also a saving in the size and weight of the machines.

Indeed, it is the booster that increases the performance of the base ventilator, by modifying the aerodynamic shape of the fan blades (diameter, width, incline, etc.) in order to cover the need of the most powerful machines, while providing the advantages of a dual-plate fan, and the simplicity of single-plate manufacturing.

The better dissipated power leads to a better productivity of the machine, and the greater air flow leads to a better cooling thereof.

Finally, the speed of assembly leads to a simplification of the manufacturing process.

Thus, the proposed solution makes it possible to have a hybrid solution between the two types of design that are conventionally encountered, in order to obtain the best aeraulic and electrical performances with a simple mechanical structure and above all a rapid assembly system providing easy industrial production.

One or more different boosters may cover the needs of a full range of alternators.

The booster may include blade extensions positioned radially as a continuation of the blades of the base ventilator. It is thus possible to increase the length of the blades and to give them the most appropriate shape from an aerodynamic perspective.

The blade extensions may thus be positioned radially beyond the plate of the base ventilator.

The blade extensions preferably consist of a single piece with the plate of the booster.

The base ventilator may be made of metal or plastic, preferably metal, particularly aluminum.

The blade extensions may be organized to be mechanically hooked to the blades, in particular on the back edge. In an example for implementing the invention, the blades each include a notch and the blade extensions each include a corresponding hook.

The blade extensions may cover the end parts of the blades, over the majority of the height of the blades.

The blade extensions may have indentations and the blades may be positioned in the thickness of these indentations.

The blade extensions may extend towards the center via a rib, the height of which decreases as it approaches the center.

Another object of the invention is an electric machine provided with a base ventilator according to the invention, suitable for mounting a booster thereon.

The base ventilator may thus include means for mechanically hooking the booster at the front and/or at the back, in particular notches on the back edge of the blades as is mentioned above.

Another object of the invention is a booster intended to be fixed on a base ventilator according to the invention, including blade extensions and/or a front plate, in particular as are defined above.

This booster may include means for mechanical hooking at the front and/or the back of the base ventilator, in particular hooks for engaging notches of the base ventilator.

A further object of the invention is a range of electric machines, including:
- a first machine including a rotor cooled by a base ventilator, preferably having a single plate, including blades preferably consisting of a single piece with the plate, without a booster,
- a second machine, in particular more powerful than the first, including a rotor cooled by a base ventilator, identical to that of the first machine, and a booster attached to this ventilator, this booster preferably including a plate positioned opposite that of the base ventilator.

The range of machines may include a third machine, including a rotor cooled by a base ventilator, identical to that of the first and second machines, and a booster attached to this ventilator, this booster preferably including a plate positioned opposite that of the base ventilator, this booster being different to that of the second machine.

The invention also relates to a method for increasing the cooling power of a base ventilator, preferably having a single plate, for electric machine cooling, including the step of fixing, on the ventilator, a booster, preferably including a plate positioned opposite that of the base ventilator.

When the electric machine for which the invention is used is an alternator, the latter is generally driven by an internal combustion engine which delivers a mechanical power through a rotational speed and a torque. For standard uses, the rotational speed is 1500 rpm or 1800 rpm. The fan formed from the assembly of the base ventilator and of the booster is subjected to a centrifugal force proportional to the inertia thereof and to the square of the rotational speed, which tends to radially deform the booster. In addition, if the direction of rotation is considered as a reference, the average torque delivered by the engine is generally positive. However, in fact, due to the operating principle thereof (n explosions per revolution), these engines deliver a cyclic torque of varying intensity over extremely short periods of time. This leads to a succession of very brief accelerations and decelerations. Moreover, the rotational inertia of the rotor of the alternator is relatively high, and during the stop phase of the engine, the kinetic energy of the rotor generates a torque which tends to angularly deform the booster.

Mechanical assembly at the front and at the back of the base ventilator and a partial overlap of the blades and blade extensions make it possible to provide very good resistance to these mechanical stresses.

Assembly at the back is preferably provided by shape fitting, in particular by notches and hooks, as is mentioned above.

Assembly at the front may be provided by screws which pass through the booster, bear on the front face thereof, and come into engagement in the base ventilator.

The booster is preferably organized to be more efficient in one direction of rotation, preferably the clockwise direction, the industrial engines intended for this type of use generally all rotating in the same direction. The assembly at the back of the base ventilator may be effected by an anti-clockwise rotational movement of the booster relative to the base ventilator.

The invention can be better understood on reading the following detailed description, of a non-limiting example for implementing the invention, and on examining the appended drawing, in which:

FIG. 1 shows a fan 10 according to the invention, used for cooling an electric machine.

Figure 2:
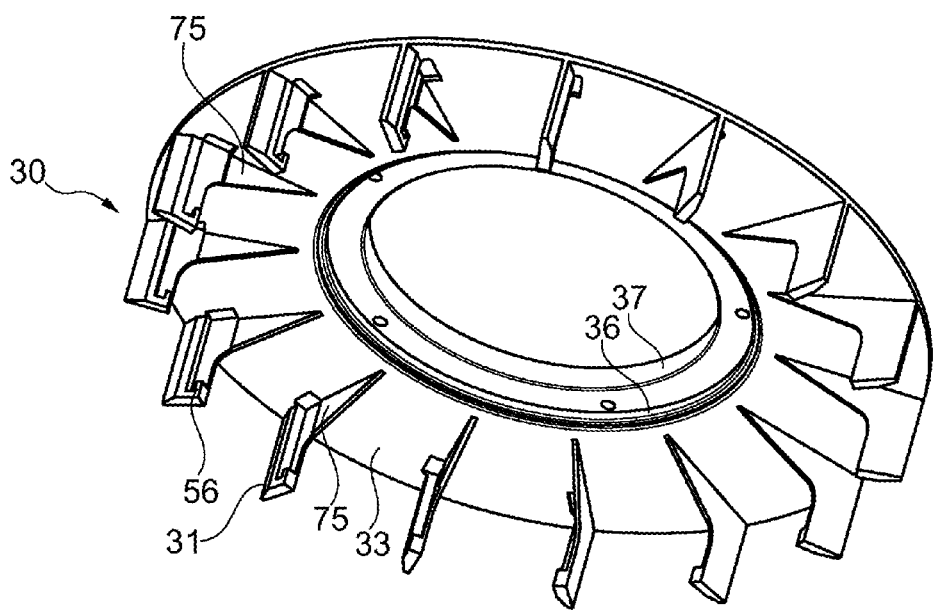
FIG. 2 shows, in isolation, the booster of the fan of FIG. 1, FIGS. 3 and 4 are two axial section views of the fan of FIG. 1.

The fan 10 includes a base ventilator 20 on which a booster 30, which is shown in isolation in FIG. 2, is fixed.

This fan 10 is rotated about an axis X by the rotor of the machine, which has not been shown for the sake of clarity of the drawing.

The electric machine is, for example, a motor or an alternator.

The rotor may be of any type, optionally with permanent magnets.

In the case of an alternator, the rotor may include a main machine inductor and an exciter armature.

Figure 1:
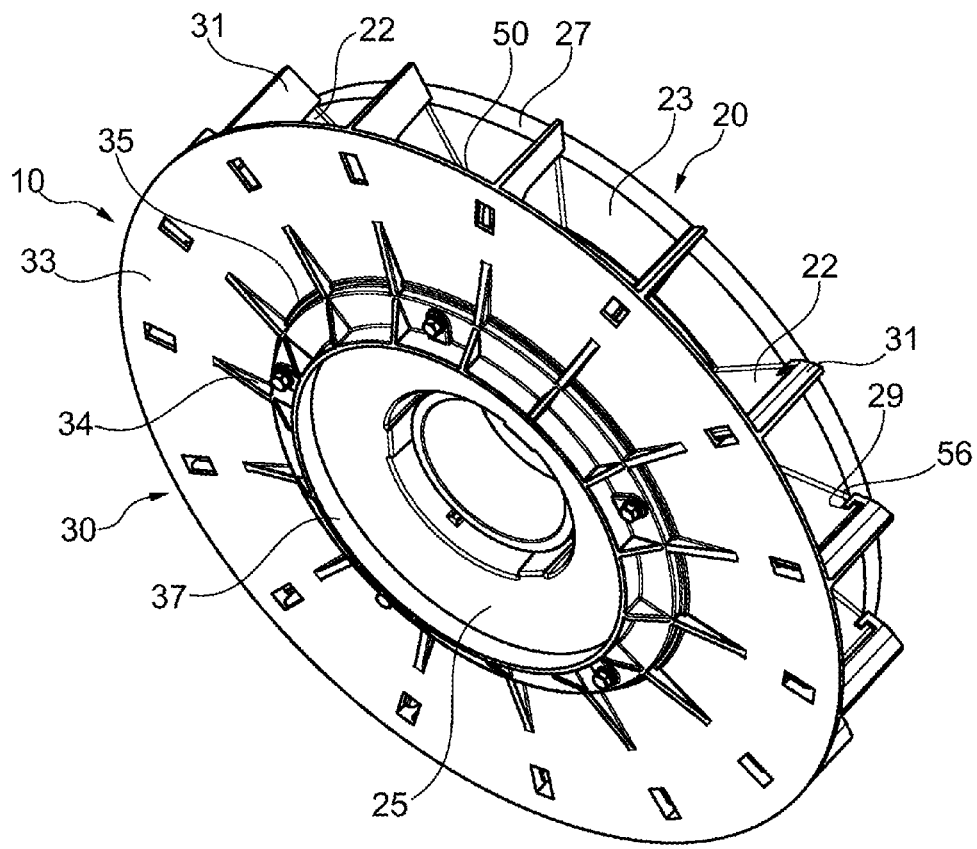
FIG. 1 shows in isolation, in perspective, an example of a cooling fan, made up of a base ventilator and of a booster, according to the invention.

The rotor may rotate a single cooling fan as illustrated in FIG. 1, or several fans, for example each arranged at an end of the rotor.

Figure 5:
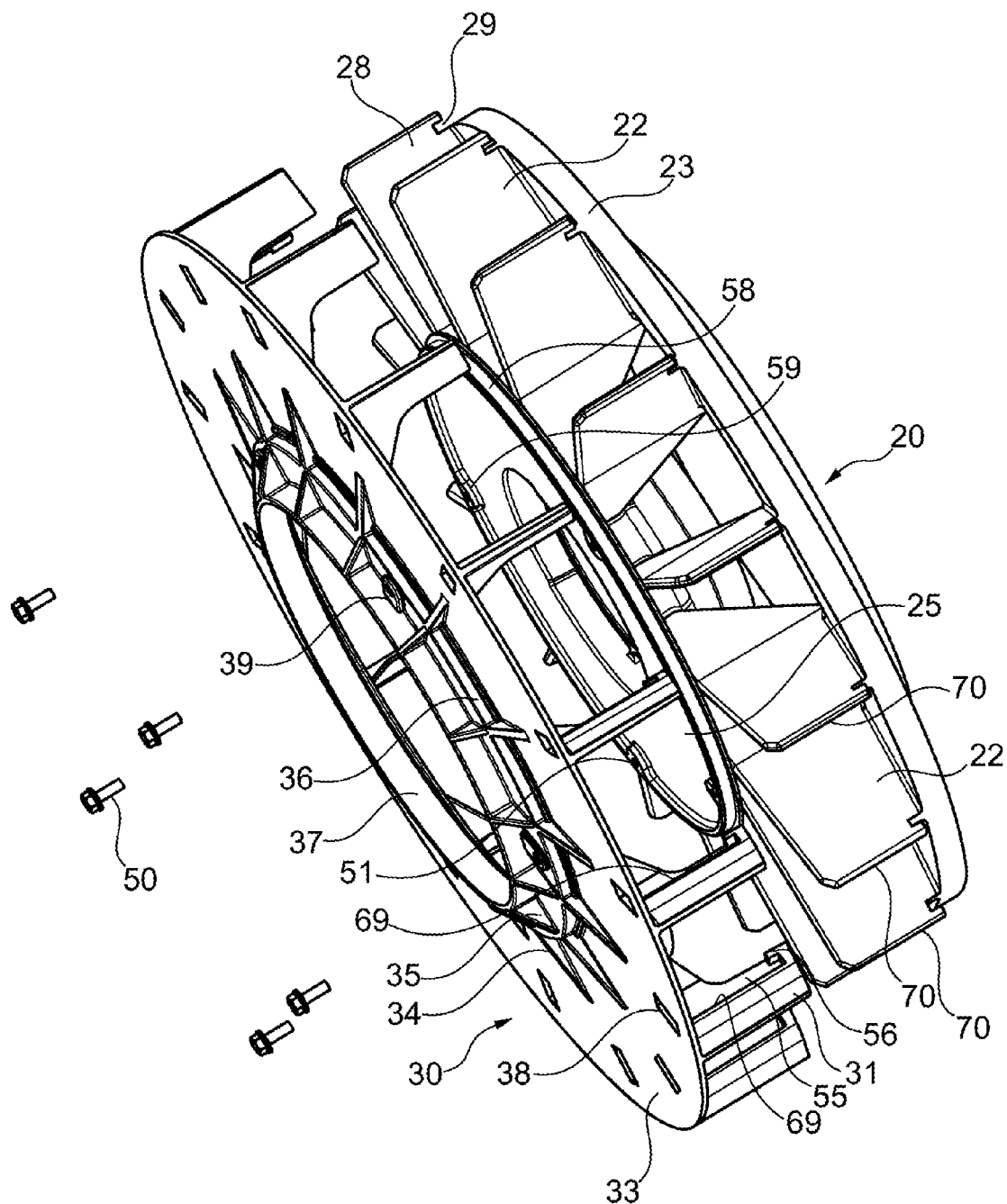
FIG. 5 illustrates the assembly of the booster on the base ventilator.

As may be seen in particular in FIGS. 3-5, the base ventilator 20 includes a hub 21, which allows the base ventilator 20 to be fixed on the rotor shaft, and a plurality of blades 22 which extend towards the outer periphery of the base ventilator from the hub 21. The blades 22 are connected to each other by a backplate 23, of generally annular shape.

The hub 21 is extended at the front end thereof, opposite the backplate 23, by a front disk 25 which connects the blades 22 in the region thereof adjacent to the hub 21.

It is seen more particularly in FIG. 4 that the blades 22 may have a height which increases over the region thereof connected to the front disk 25. The blades 22 reach a maximum height substantially at an annular rib 26 of the plate 23, which projects towards the back on the ventilator 20, on the side opposite the front disk 25. The height of the blades 22 then slightly decreases up to a second annular rib 27 of the plate 23, concentric with the first and radially more external.

The booster 30 includes blade extensions 31 which are arranged thereon in such a manner as to each be placed in the continuation, radially outwardly, of a corresponding blade 22 of the ventilator 20.

The extensions 31 are connected to a front plate 33, which, on the face thereof opposite the extensions 31, includes two series 34, 35 of stiffening ribs, each extending radially. The ribs 34 are interconnected by a first annular rib 36 and the ribs 35 by a second annular rib 37, concentric with the first. The height of the ribs 34, 35 increases as they approach the center and the annular rib to which they are connected.

The front plate 33 also includes openings 38 which allow the passage of mold elements necessary for making the booster 30 from a single piece by molding thermoplastic material, in particular polyamide.

The front plate 33 also bears studs 39 which are penetrated by screw through-holes 50 used for fixing the booster 30 on the base ventilator 20. These screws 50 are fixed in corresponding internal threads 51 of the disk 25, provided on studs 59.

In the example illustrated, the base ventilator 20 is made monolithically of metal, in particular aluminum or an aluminum alloy, by molding and/or machining.

Preferably, as illustrated, the blades 22 and the extensions 31 are made in such a manner as to cooperate mechanically and increase the mechanical hooking between the base ventilator 20 and the booster 30. More particularly, the blades 22 may be made with, on an end portion 28 extending radially beyond the plate 23, a notch 29, open on the back edge opposite the front disk 25.

The extensions 31 are each made with a recess 55 which has a shape substantially complementary to the end portion 28 provided with the notch 29, such as to achieve the desired mechanical hooking. For example, as illustrated, the extensions 31 are each made with a hook 56 which engages the notch 29, when the booster 30 is assembled on the base ventilator 20, as illustrated in FIG. 1. The recess 55 defines an indentation 69 opposite which the end edge 70 of a blade 22 is positioned.

The diameter of the annular rib 37 is slightly less than that of the front disk 25, and the latter may be made with, at the periphery, an annular rib 58 adjacent the studs 59 for receiving the screws 50.

The extensions 31 are extended towards the center of the booster by radial ribs 75, the height of which decreases towards the center.

These ribs 75 each overlap a corresponding blade 22, as can be seen in particular in FIG. 4.

To assemble the booster 30 on the base ventilator 20, the operator may initially, as illustrated in FIG. 5, axially bring the booster 30 closer to the base ventilator 20, the base ventilator having the front disc 25 thereof directed towards the booster 30 and the latter having the extensions 31 directed towards the base ventilator 20.

The extensions 31 are brought level with the end regions 28 of the blades 22, then the booster 30 is rotated about the axis X relative to the base ventilator 20, in the anticlockwise direction in the example in question, such as to engage the hooks 56 in the notches 29 and obtain the assembly illustrated in FIG. 1.

The screws 50 may then be inserted through the studs 39 and screwed into the internal threads 51 to permanently fix the booster 30 on the base ventilator 20.

The invention makes it possible to optionally provide, depending on the cooling needs, already furnished electric machines with the base ventilator 20.

Thus, depending on the cooling needs of a range of machines all provided with the same base ventilator 20, boosters 30 may be assembled on only some of the base ventilators 20 of these machines, such as to provide an additional cooling power.

Of course, the invention is not limited to the example which has just been described.

It is possible, for example, to modify the shape of the base ventilator 20, and in particular the shape and the orientation of the blades 22 and the shape of the backplate 23 or of the front disk 25.

Similarly, it is possible to modify the shape of the blade extensions 31 and the shape of the front plate 33 to which they are connected, depending on, in particular, the desired air flow.

The mechanical hooking of the extensions 31 on the blades 22 may take place other than with a hook-and-notch-type cooperation such as illustrated, for example via a snap-fastening or clamping assembly.

Thus, there may be a multitude of blade shapes, in particular straight, inclined or curved, of locking or snap-fastening systems at the back of the blades of the base ventilator and at fixing level on the front face.

The expression "including one" is to be understood as being synonymous with "including at least one", unless otherwise specified.

The invention claimed is:

1. An electric machine including a rotor cooled by a single-plate base ventilator including blades, and a booster attached to the single-plate ventilator, the booster including a plate positioned opposite that of the base ventilator, wherein the booster includes blade extensions positioned radially as a continuation of the blades of the base ventilator, the blade extensions each extending towards the center by a rib, the height of which decreases as it approaches the center.

2. The machine as claimed in claim 1, the blade extensions consisting of a single piece with the plate of the booster.

3. The machine as claimed in claim 1, the base ventilator being made of metal.

4. The machine as claimed in claim 1, the booster being made of plastic.

5. The machine as claimed in claim 1, the blade extensions being organized to be mechanically hooked to the blades.

6. The machine as claimed in claim 1, the blades each including a notch and the blade extensions each including a corresponding hook.

7. The machine as claimed in claim 1, the blade extensions covering the end parts of the blades over the majority of the height of the blades.

8. The machine as claimed in claim 1, the blade extensions having indentations and the blades being positioned in the thickness of these indentations.

9. The machine as claimed in claim 1, the blades consisting of a single piece with the plate.

10. A method for increasing the cooling power of a base ventilator, of an electric machine, including the step of fixing, on the ventilator, a booster including a plate positioned opposite that of the base ventilator in order to form an electric machine as claimed in claim 1.

11. An electric machine provided with a base ventilator suitable for mounting a booster thereon in order to form an electric machine including a rotor cooled by a single-plate base ventilator including blades, and a booster attached to the single-plate ventilator, the booster including a plate positioned opposite that of the base ventilator, wherein the booster includes blade extensions positioned radially as a continuation of the blades of the base ventilator, the electric machine including means for mechanically hooking the booster at the front and/or at the back, in the form of notches on the back edge of the blades.

* * * * *